(12) United States Patent
Robson et al.

(10) Patent No.: US 9,764,451 B2
(45) Date of Patent: Sep. 19, 2017

(54) HYDRAULIC BRAKE PIPE ASSEMBLY AND BRAKE PIPE FITTING TOOL

(71) Applicant: Nissan North America, Inc., Franklin, TN (US)

(72) Inventors: Paul Robson, Milford, MI (US); Scott Warnecke, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 268 days.

(21) Appl. No.: 14/202,086

(22) Filed: Mar. 10, 2014

(65) Prior Publication Data

US 2015/0251298 A1    Sep. 10, 2015

(51) Int. Cl.
| | |
|---|---|
| *B60T 13/66* | (2006.01) |
| *B25B 13/08* | (2006.01) |
| *B25B 13/48* | (2006.01) |
| *B60T 17/04* | (2006.01) |

(52) U.S. Cl.
CPC .............. *B25B 13/48* (2013.01); *B25B 13/08* (2013.01); *B60T 17/046* (2013.01); *Y10T 137/598* (2015.04)

(58) Field of Classification Search
CPC ......... B25B 13/06; B25B 13/08; B25B 13/48; B25B 13/488; B25B 13/56; B60T 17/00; B60T 17/046; Y10T 137/598
USPC .... 303/1; 81/3.09, 124.4, 125.1, 177.1, 437; D8/21; 7/138
See application file for complete search history.

(56) References Cited

U.S. PATENT DOCUMENTS

| | | | | |
|---|---|---|---|---|
| 1,261,006 | A | | 4/1918 | Bartelt |
| 1,406,331 | A | | 2/1922 | Bartelt |
| 1,930,238 | A | * | 10/1933 | Heller ...................... B25B 13/06 |
| | | | | 411/403 |
| 2,605,665 | A | * | 8/1952 | Grenat ...................... B25F 1/00 |
| | | | | 72/458 |
| 3,877,327 | A | * | 4/1975 | Erm ........................ B25B 13/06 |
| | | | | 81/124.4 |
| 4,223,923 | A | * | 9/1980 | Hill .......................... F16L 27/12 |
| | | | | 277/562 |
| 4,718,317 | A | | 1/1988 | Hensler |
| 6,295,897 | B1 | * | 10/2001 | Swank ............... A63C 17/0006 |
| | | | | 7/138 |

(Continued)

*Primary Examiner* — Melody Burch
(74) *Attorney, Agent, or Firm* — Global IP Counselors, LLP

(57) ABSTRACT

A brake pipe fitting tool includes a first hydraulic pipe wrench, a second hydraulic pipe wrench, a connecting portion and a handle portion. The first hydraulic pipe wrench has a first jaw defining a first hydraulic pipe insertion opening. The second hydraulic pipe wrench has a second jaw defining a second hydraulic pipe insertion opening. The connecting portion connects the first hydraulic pipe wrench to the second hydraulic pipe wrench such that the first hydraulic pipe wrench and the second hydraulic pipe wrench are fixedly and rigidly connected to one another and spaced apart from one another by a predetermined distance. The first hydraulic pipe insertion opening and the second hydraulic pipe insertion opening are parallel to one another and aligned with one another. The handle portion is rigidly fixed to one of the first hydraulic pipe wrench, the second hydraulic pipe wrench or the connecting portion.

10 Claims, 8 Drawing Sheets

(56) References Cited

U.S. PATENT DOCUMENTS

| | | | |
|---|---|---|---|
| 6,502,483 B1 * | 1/2003 | Swank | B25B 13/56 7/138 |
| 2006/0150783 A1 * | 7/2006 | Thompson | B25B 13/04 81/124.4 |
| 2013/0036874 A1 * | 2/2013 | Chan | B25B 13/463 81/58.2 |
| 2013/0139345 A1 | 6/2013 | Buchler et al. | |
| 2015/0097366 A1 * | 4/2015 | Glidewell | B60T 17/043 285/62 |

* cited by examiner

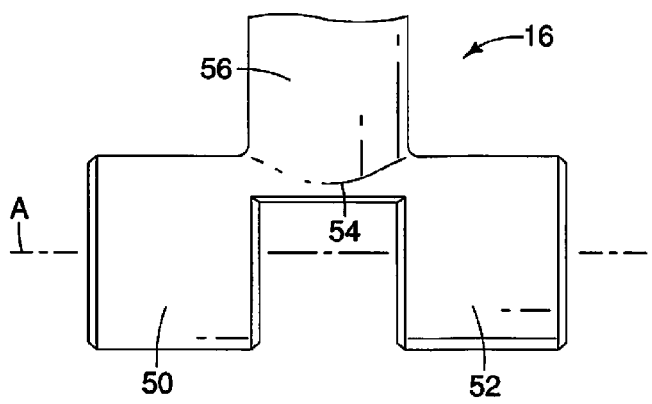
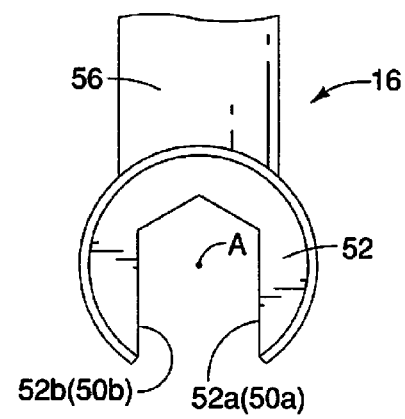
FIG. 11  FIG. 12
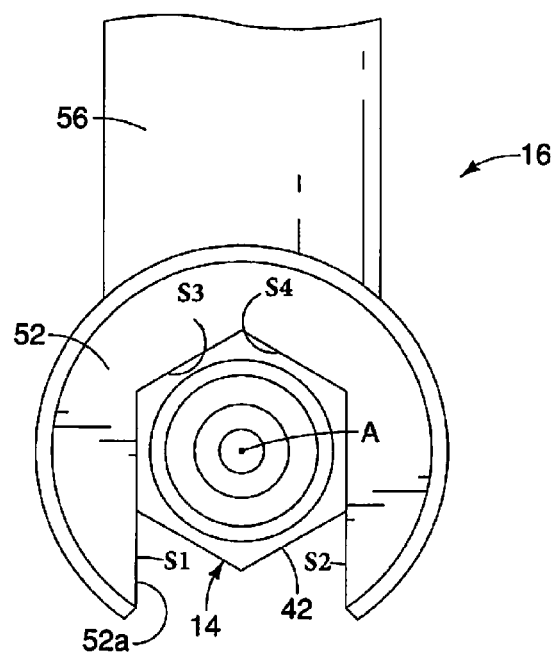
FIG. 13

HYDRAULIC BRAKE PIPE ASSEMBLY AND BRAKE PIPE FITTING TOOL

BACKGROUND

Field of the Invention

The present invention generally relates to a hydraulic brake pipe assembly and brake pipe fitting tool. More specifically, the present invention relates to a hydraulic brake pipe assembly that is used in hydraulic lines between a brake master cylinder and a vehicle dynamic control unit, and a brake pipe fitting tool that is used to install and uninstall the hydraulic brake pipe assembly.

Background Information

Vehicles often include one or more vehicle control systems that assist in stabilizing operation of the vehicle in adverse driving conditions. These vehicle control systems can manipulate the hydraulic pressure provided to one or more wheels of the braking system of the vehicle. For example, many vehicles include one, two or all of the following systems: an anti-lock braking system (ABS); a traction control system (TCS) and a vehicle dynamic control (VDC), sometimes referred to as an electronic stability control system (ESC). One or more of these systems can include wheel sensors, with one wheel sensor located at each wheel of the vehicle, where the wheel sensors detect whether any one of the wheels of the vehicle has lost traction (i.e. is rotating faster or slower than the other wheels). These systems react by, for example, manipulating the hydraulic pressure of the braking mechanism at a selected one or ones of the wheels in order to help stabilize the vehicle and regain traction in all four wheels of the vehicle. During certain driving circumstances, one or more of these systems can cause predetermined changes in the hydraulic pressure of the braking system, including repeated pulsing of the hydraulic pressure to one or more of the wheels. This pulsing can sometimes be felt by the vehicle operator via the brake pedal, and/or cause audible noise within the vehicle cabin.

SUMMARY

One object of the disclosure is to provide a hydraulic brake pipe assembly connected to hydraulic lines of a vehicle braking system between a master brake cylinder and a the vehicle dynamic control unit, where the hydraulic brake pipe assembly includes a cushioning feature that at least partially absorbs pulsing caused by rapid fluctuations in hydraulic brake pressure produced by the control unit and otherwise felt at the brake pedal and/or heard within the vehicle cabin.

Another object of the disclosure is to provide a special wrench that is dimensioned and designed to install and uninstall the hydraulic brake pipe assembly.

In view of the state of the known technology, one aspect of the disclosure is a brake pipe fitting tool that includes a first hydraulic pipe wrench, a second hydraulic pipe wrench, a connecting portion and a handle portion. The first hydraulic pipe wrench has a first jaw defining a first hydraulic pipe insertion opening. The second hydraulic pipe wrench has a second jaw defining a second hydraulic pipe insertion opening. The connecting portion connects the first hydraulic pipe wrench to the second hydraulic pipe wrench such that the first hydraulic pipe wrench and the second hydraulic pipe wrench are fixedly and rigidly connected to one another and spaced apart from one another by a predetermined distance. The first hydraulic pipe insertion opening and the second hydraulic pipe insertion opening are parallel to one another and aligned with one another. The handle portion is rigidly fixed to one of the first hydraulic pipe wrench, the second hydraulic pipe wrench or the connecting portion.

BRIEF DESCRIPTION OF THE DRAWINGS

Referring now to the attached drawings which form a part of this original disclosure:

FIG. 11 is a side view of one end of the brake pipe fitting tool showing the first hydraulic pipe wrench, the second hydraulic pipe wrench, the connecting portion and the portion of the handle portion in accordance with the first embodiment;

FIG. 12 is another side view of one end of the brake pipe fitting tool showing the second hydraulic pipe wrench, the connecting portion and the portion of the handle portion in accordance with the first embodiment;

FIG. 13 is an end view of the brake pipe fitting tool showing the second hydraulic pipe wrench fitted to the hydraulic brake pipe assembly in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
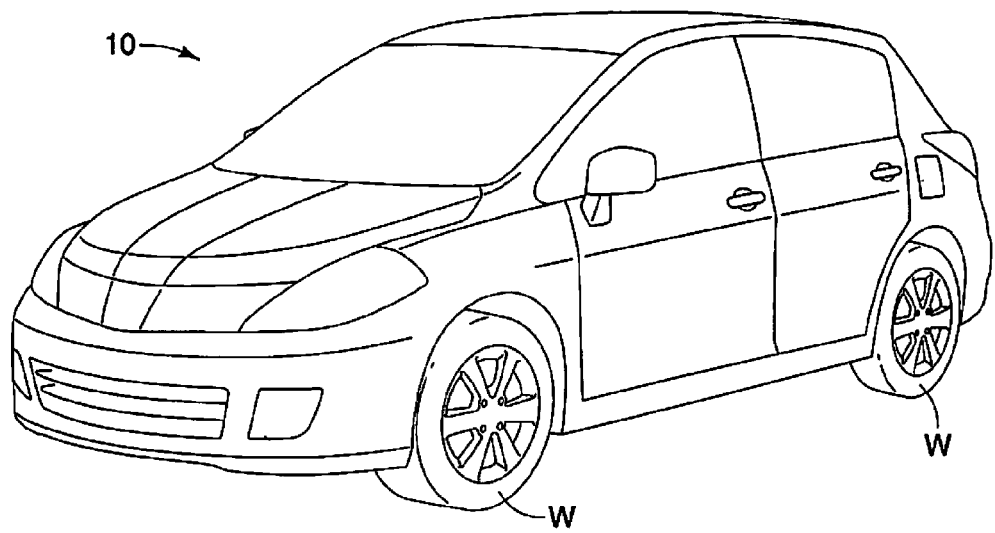
FIG. 1 is a perspective view of a vehicle having a braking system in accordance with a first embodiment.
Figure 2:
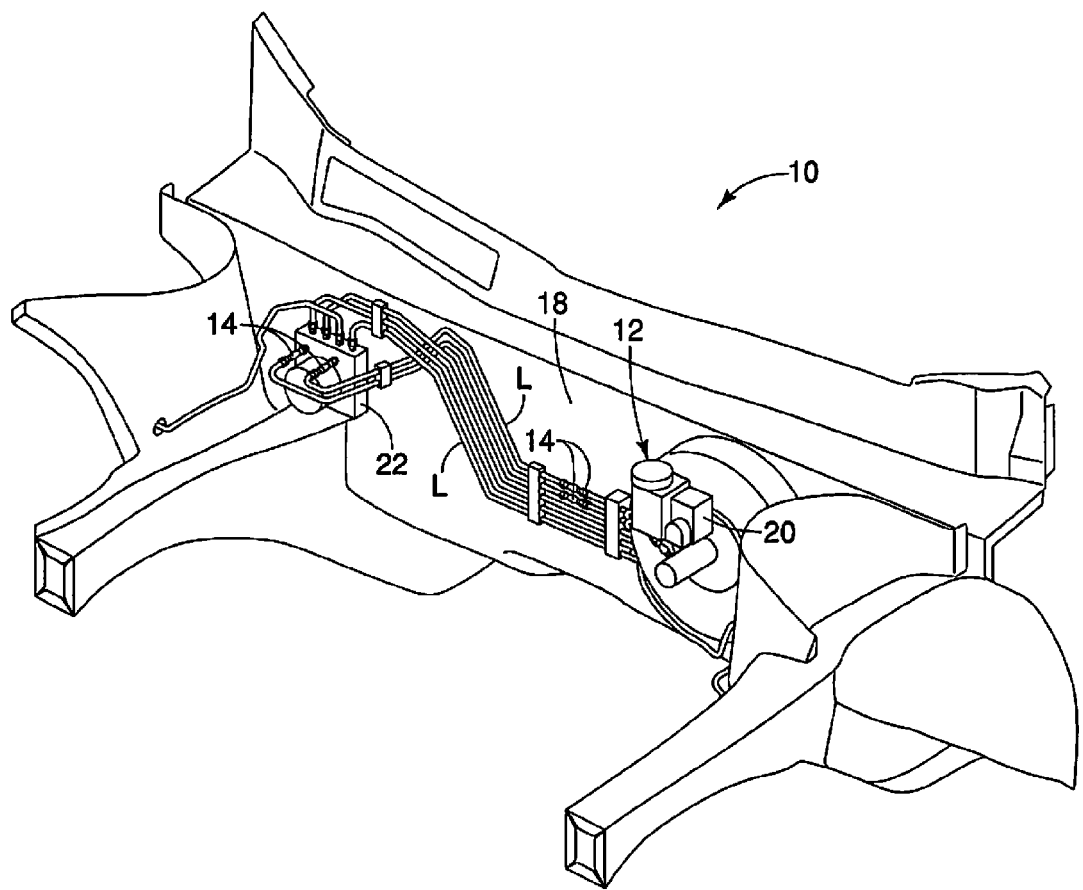
FIG. 2 is a perspective view of an engine compartment showing portions of the braking system including a master brake cylinder, a hydraulic brake pipe assembly and a vehicle dynamic control unit in accordance with the first embodiment.

Referring initially to FIGS. 1 and 2, a vehicle 10 having a braking system 12 (FIG. 2) is illustrated in accordance with a first embodiment. As described in greater detail below, the braking system 12 includes a hydraulic brake pipe assembly 14. The hydraulic brake pipe assembly 14 is installed and uninstalled using a special wrench, specifically a brake pipe fitting tool 16 that is described below with reference to FIGS. 9-14.

Figure 5:
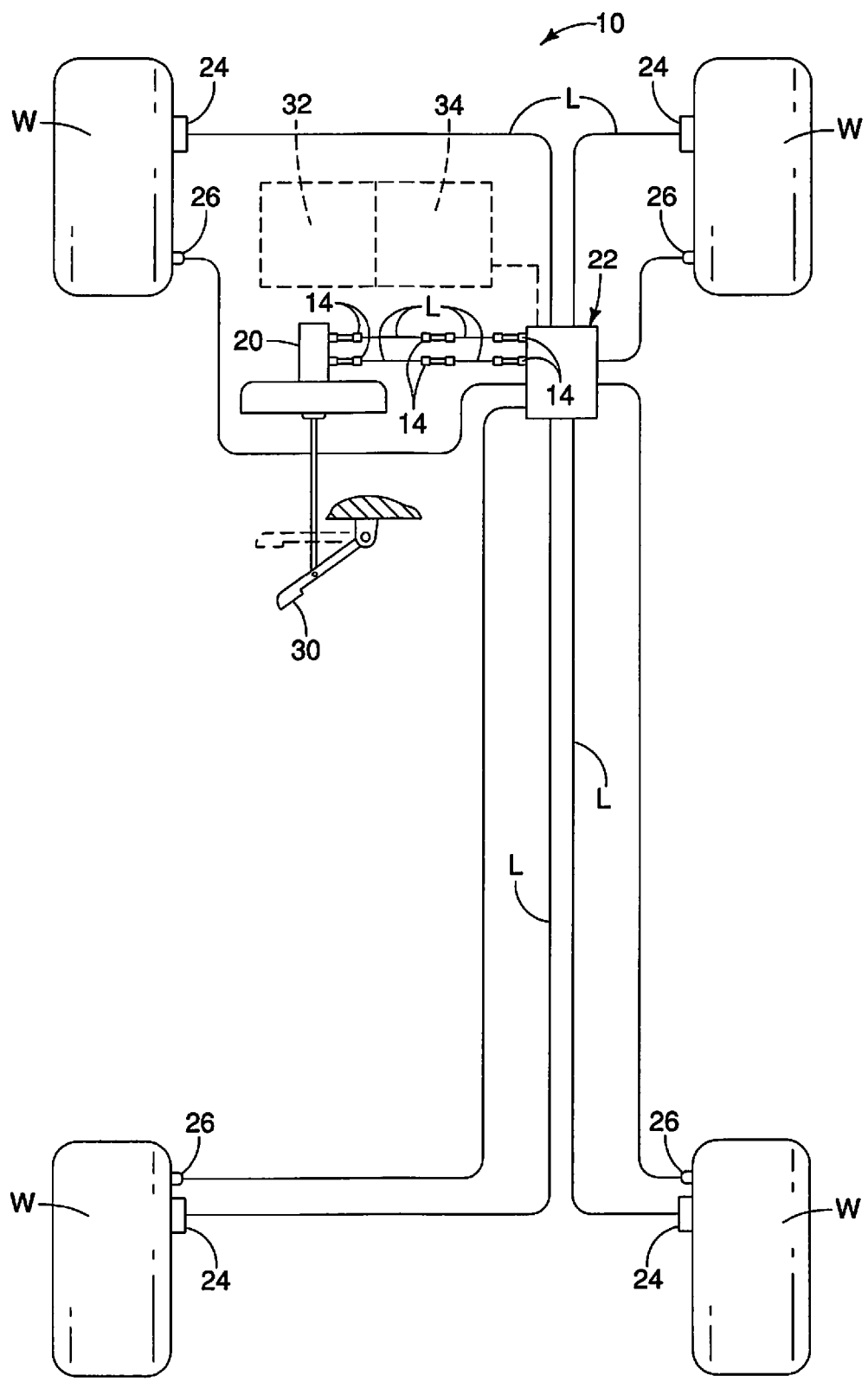
FIG. 5 is a schematic view of the braking system showing the master brake cylinder, the vehicle dynamic control unit, wheel brake cylinders and wheel speed sensor in accordance with the first embodiment.

The braking system 12 of the vehicle 10 is now briefly described with specific reference to FIGS. 2 and 5. Portions of the braking system 12 are fixed to a dash wall 18 of the vehicle 10 within the engine compartment of the vehicle 10, as shown in FIG. 2. The braking system 12 includes a master cylinder 20, a vehicle dynamic control unit 22, wheel brake units 24, wheel speed sensors 26, hydraulic lines L and at least two hydraulic brake pipe assemblies 14. The master cylinder 20, the vehicle dynamic control unit 22, portions of the hydraulic lines L and the hydraulic brake pipe assemblies 14 are installed along the dash wall 18.

As indicated in FIG. 5, the master cylinder 20 is mechanically connected to a brake pedal 30 that is disposed within a passenger compartment of the vehicle 10. A vehicle operator presses against the brake pedal 30 causing the master cylinder 20 to increase hydraulic pressure within the hydraulic lines L in a conventional manner. The increased hydraulic pressure is transmitted through the hydraulic lines L and through the vehicle dynamic control unit 22 and subsequently to the wheel brake units 24, thereby operating the brakes at each wheel W. Since operation of the brake system 12, and in particular, the effects of increased hydraulic pressure are well known, further description is omitted for the sake of brevity. Further, since master cylinders and brake pedals are conventional features of a vehicle, further description is omitted for the sake of brevity.

The vehicle dynamic control unit 22 is a hydraulic pressure control device that is connected in line to hydraulic lines L of the braking system 12 downstream from the master cylinder 20 and upstream from the wheel brake units 24. The vehicle dynamic control unit 22 can further be connected to elements of an engine 32 and transmission 34 such that the vehicle dynamic control unit 22 can operate the wheel brake units 24 to carry out actions to maintain stable operation of the vehicle 10 under certain driving and/or road conditions. For instance, the vehicle dynamic control unit 22 can include one, two or all of the following systems: an anti-lock braking system (ABS); a traction control system (TCS) and a vehicle dynamic control unit (VDC), sometimes referred to as an electronic stability control system (ESC).

The ABS system is provided to maintain tractive contact with the road surface according to driver inputs while braking, thereby preventing the wheels W from locking up and ceasing rotation while the vehicle 10 is still in motion. The TCS is provided to prevent loss of traction between the wheels W and the road surface, where at least two of the wheels W are rotated by the engine 32 to move the vehicle 10. The VDC system is similarly provided to detect loss of traction relative to steering control and take appropriate braking actions to help steer the vehicle 10 under certain conditions. All three systems, ABS, TCS and VDC can take actions to stabilize the vehicle 10 by, for example, applying hydraulic fluid pressure to selected ones of the wheel brake units 24 under certain conditions. ABS, TCS and VDC systems are conventional features of the vehicle 10 and are either part of the vehicle dynamic control unit 22 or are separate units programmed to control operation of the vehicle dynamic control unit 22. Therefore further description is omitted for the sake of brevity.

In the depicted embodiment, the vehicle dynamic control unit 22 is a hydraulic pressure controlling mechanism that includes electronic circuitry programmed or hardwired with the operational instructions and logic of the ABS, TCS and VDC systems. Alternatively, the vehicle dynamic control unit 22 can be a mechanical device that manipulates hydraulic pressure in the hydraulic lines L in response to a separate electronic control unit, where a separate electronic control unit (ECU) is provided with circuitry and logic systems that carry out the operations of the ABS, TCS and VDC systems.

There are four wheel brake units 24, one at each wheel W of the vehicle 10. The wheel brake units 24 are located at each of the wheels W of the vehicle 10 in a conventional manner, and are preferably calipers that are mated with a rotor (not shown) fixedly attached to the adjacent wheel W for rotation therewith. The wheel speed sensors 26 are similarly located adjacent to a corresponding one of the wheels W of the vehicle 10, such that each wheel speed sensor 26 detects the speed of rotation of the adjacent wheel W. Since wheel brake units 24, such as brake calipers and rotors, are conventional features, further description is omitted for the sake of brevity.

The hydraulic lines L hydraulically connect the master cylinder 20 to the vehicle dynamic control unit 22 and connect the vehicle dynamic control unit 22 to each of the wheel brake units 24. The master cylinder 20 includes two separate hydraulic pressure circuits such that each of the two hydraulic lines L connected to the master cylinder 20 is provided with a separate source of hydraulic fluid that is pressurized with hydraulic pressure upon the pressing of the brake pedal 30. Typically, one of the hydraulic lines L leaving the master cylinder 20 controls the wheel brake units 24 at the front of the vehicle 10, and the other of the hydraulic lines L leaving the master cylinder 20 controls the wheel brake units 24 at the rear of the vehicle 10.

Each of the two hydraulic lines L connecting to the master cylinder 20 to the vehicle dynamic control unit 22 includes one of the two hydraulic brake pipe assemblies 14. Hence, the hydraulic brake pipe assemblies 14 are located in-line between the master cylinder 20 and the vehicle dynamic control unit 22.

During operation of the vehicle dynamic control unit 22, while implementing actions of one or more of the ABS, TCS and VDC systems, the vehicle dynamic control unit 22 can change the level of hydraulic pressure to one or more of the wheel brake units 24. In particular, the vehicle dynamic control unit 22 can cause the hydraulic pressure in one or more of the wheel brake units 24 to undergo pulses of predetermined levels of hydraulic pressure. The hydraulic brake pipe assemblies 14 are specifically designed to absorb at least a portion of any backlash of hydraulic pressure that might travel back from the vehicle dynamic control unit 22 to the master cylinder 20.

Figure 6:
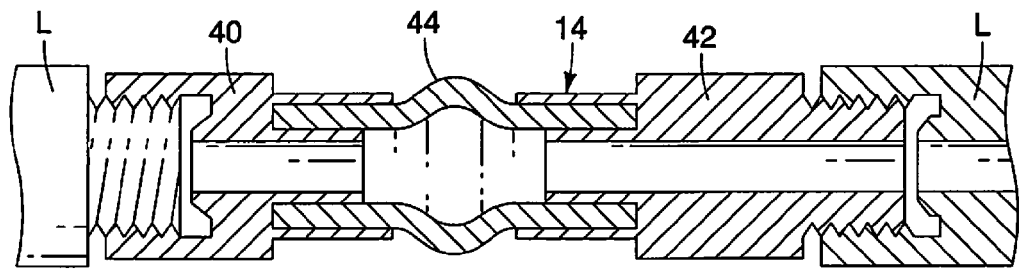
FIG. 6 is a cross-sectional view of one of the hydraulic brake pipe assembly fixed a to brake line of the braking system in accordance with the one embodiment.
Figure 7:
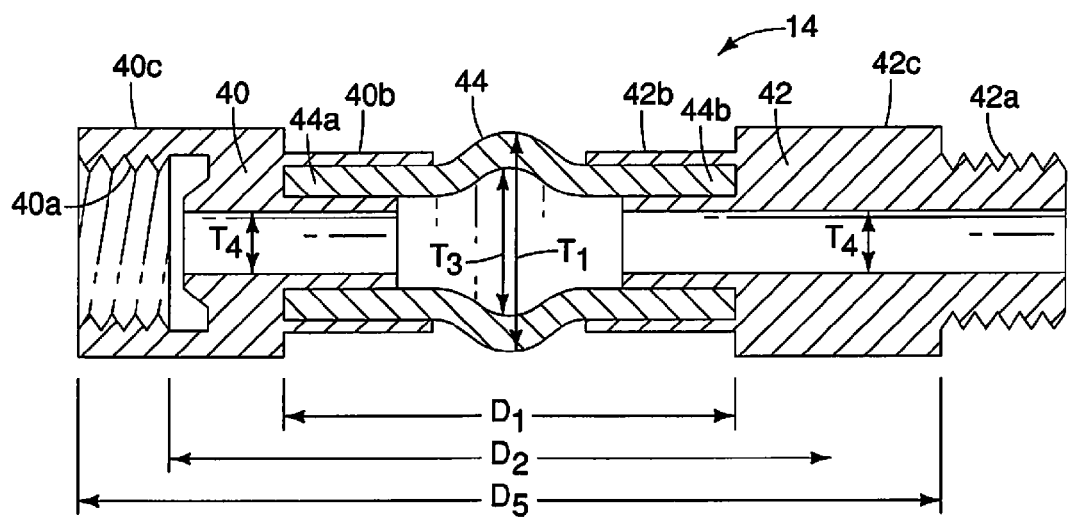
FIG. 7 is a cross-sectional view of the hydraulic brake pipe assembly in accordance with the first embodiment.
Figure 8:
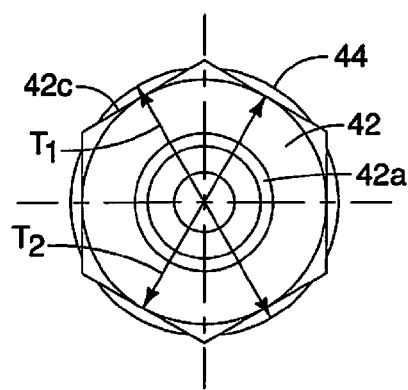
FIG. 8 is an end view of the hydraulic brake pipe assembly in accordance with the first embodiment.
Figure 9:
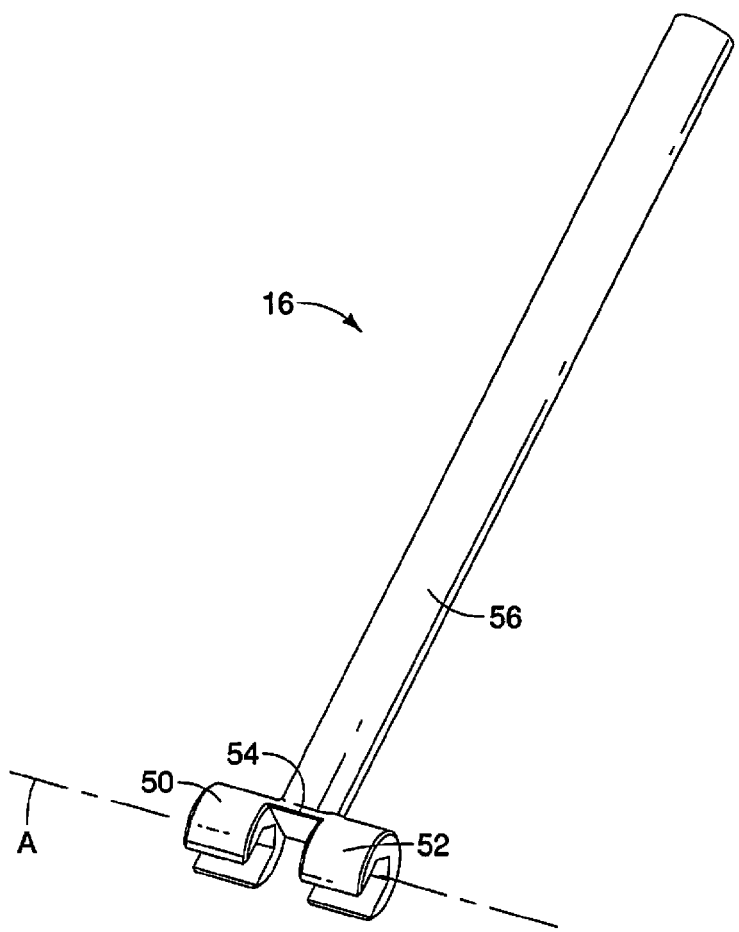
FIG. 9 is a perspective view of a brake pipe fitting tool showing a handle portion in accordance with the first embodiment.

A description is now provided of the hydraulic brake pipe assemblies 14 with specific reference to FIGS. 6, 7 and 8. Since the hydraulic brake pipe assemblies 14 are identical to one another, description of one applies equally to both. Therefore, only one of the hydraulic brake pipe assemblies 14 is now described.

The hydraulic brake pipe assembly 14 includes a first hydraulic metallic fitting 40, a second hydraulic metallic fitting 42 and a flexible hose portion 44 that extends from the first hydraulic metallic fitting 40 to the second hydraulic metallic fitting 42. The first hydraulic metallic fitting 40 has an internally threaded bore 40a (a female fitting) and a collar 40b. Further, an outer surface of the first hydraulic metallic fitting 40 defines a wrench receiving portion 40c. The second hydraulic metallic fitting 42 has an externally threaded outer portion 42a (a male fitting) and a collar 42b. Further, an outer surface of the second hydraulic metallic fitting 42 defines a wrench receiving portion 42c. The wrench receiving portion 40c and the wrench receiving portion 42c have hexagonal outer surfaces that serve as wrench contacting surfaces in a conventional manner.

A first end 44a of the flexible hose portion 44 is fitted to the collar 40b and a second end 44b opposite the first end 44a of the flexible hose portion 44 is fitted to the collar 42b. The flexible hose portion 44 is fixed in position relative to each of the collar 40b and the collar 42b by, for example, crimping, and/or adhesive and sealant material. The flexible hose portion 44 has sufficient rigidity such that hydraulic forces generated by the master cylinder 20 are transmitted therethrough with little or no measurable loss in fluid pressure from the first hydraulic metallic fitting 40 to the second hydraulic metallic fitting 42. However, the flexible hose portion 44 has sufficient flexibility to absorb rapid pulses of increased hydraulic pressure generated by the vehicle dynamic control unit 22, when the vehicle dynamic control unit 22 carries out changes in hydraulic pressure to one or more of the wheel brake units 24, in accordance with the operations of one or more of the ABS, TCS and VDC systems. More specifically, the flexible hose portion 44 provides a cushioning effect such that a majority of the rapid pulses of increased hydraulic pressure generated by the vehicle dynamic control unit 22 are absorbed by the flexible hose portion 44. Consequently, when the vehicle dynamic control unit 22 operates to cause rapid pulses of increased hydraulic pressure to one or more of the wheel brake units 24, the effects of pulses is reduced or eliminated with respect to transmittance to the brake pedal 30. Further the flexible hose portion 44 absorbs the pulses in a manner that reduces or eliminates noises associated with operation of the vehicle dynamic control unit 22 carrying out operations of one or more of the ABS, TCS and VDC systems.

Figure 3:
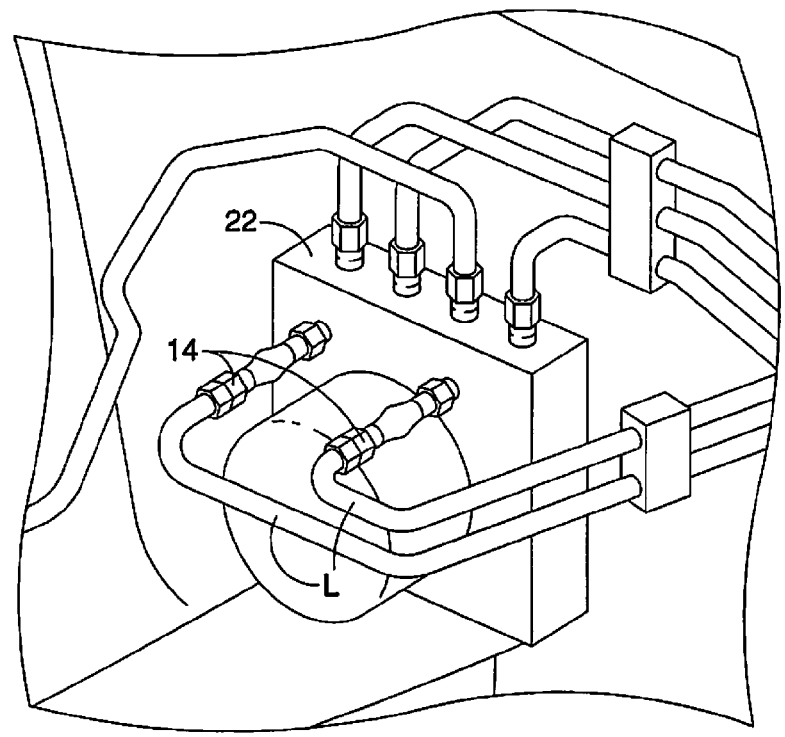
FIG. 3 is a perspective view of a portion of the engine compartment showing two of the hydraulic brake pipe assemblies directly attached to the vehicle dynamic control unit in accordance with a modification of the first embodiment.
Figure 4:
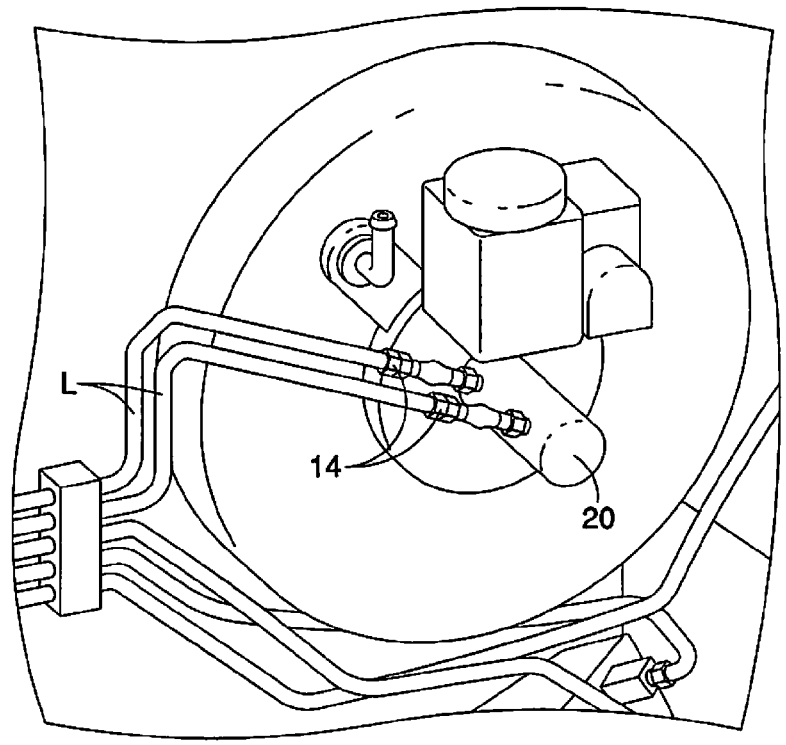
FIG. 4 is a perspective view of another portion of the engine compartment showing two of the hydraulic brake pipe assemblies directly attached to the master brake cylinder in accordance with a modification of the first embodiment.

The hydraulic brake pipe assemblies 14 can be directly attached to one or both the master cylinder 20 and/or to the vehicle dynamic control unit 22. Specifically, FIG. 3 shows a modification of the first embodiment with two of the hydraulic pipe assemblies directly installed to the vehicle dynamic control unit 22 and respective hydraulic lines L. Further, FIG. 4 shows another modification of the first embodiment with two of the hydraulic pipe assemblies directly installed to the master brake cylinder 20 and respective hydraulic lines L. However, in the first embodiment, as shown in FIGS. 2 and 5, the hydraulic brake pipe assemblies 14 are installed in-line to the hydraulic lines L between the master cylinder 20 and the vehicle dynamic control unit 22 and/or the hydraulic brake pipe assemblies 14 can be installed at one or both of the master cylinder 20 and the vehicle dynamic control unit 22. In other words, each of the hydraulic lines L includes at least one hydraulic brake pipe assembly 14 between the master cylinder 20 and the vehicle dynamic control unit 22, but can include more than one hydraulic brake pipe assembly 14. The hydraulic brake pipe assemblies 14 are specifically designed in order to absorb or cushion the occurrence of hydraulic pressure pulses directed at the wheel brake units 24 as generated by the vehicle dynamic control unit 22. Therefore, they are installed to the hydraulic lines L at any of a variety of locations between the master cylinder 20 and the vehicle dynamic control unit 22.

The flexible hose portion 44 has an overall length $D_1$, as shown in FIG. 7. The length $D_1$ also represents the distance between the wrench receiving portion 40c of the first hydraulic metallic fitting 40 and between the wrench receiving portion 42c of the second hydraulic metallic fitting 42. A length $D_2$ represents the approximate distance between centers of each of the wrench receiving portion 40c and the wrench receiving portion 42c, as is discussed in greater detail below.

The flexible hose portion 44 is made of a flexible polymer or rubber-like material. However, in order to withstand the hydraulic pressure of the braking system 12, the flexible hose portion 44 has a thickness and reinforcing layers that provides the flexible hose portion 44 with a degree of rigidity that is far greater than hoses used within a vehicle, but not as rigid as metal. As discussed above, the flexible hose portion 44 has sufficient flexibility such that it can absorb hydraulic pressure pulses produced by the vehicle dynamic control unit 22, but does not interfere with brake operation. Specifically, the hydraulic pressure generated by operation of the master cylinder 20 during braking is easily transmitted through the flexible hose portion 44.

At a mid-portion thereof, the flexible hose portion 44 has an outer diameter $T_1$ that is greater than a distance $T_2$ between opposing flat surfaces of the wrench receiving portion 42c of the second hydraulic metallic fitting 42, as shown in FIG. 8. Consequently, a corresponding inner diameter $T_3$ of the flexible hose portion 44 is larger than the inner diameter $T_4$ of adjacent portions of each of the first hydraulic metallic fitting 40 and the second hydraulic metallic fitting 42. The larger inner diameter $T_3$ of the flexible hose portion 44 at the mid-point thereof adds to the hydraulic pressure pulsing absorbing feature of the flexible hose portion 44, as discussed above.

In order to protect the flexible hose portion 44, the first hydraulic metallic fitting 40 and the second hydraulic metallic fitting 42 should not be rotated relative to one another during installation. The brake pipe fitting tool 16 is designed to protect the flexible hose portion 44 such that when the first hydraulic metallic fitting 40 and the second hydraulic metallic fitting 42 are installed to corresponding brake lines L, the first hydraulic metallic fitting 40 and the second hydraulic metallic fitting 42 are rotated as one element by the brake pipe fitting tool 16. Specifically, the brake pipe fitting tool 16 rotates the first hydraulic metallic fitting 40 and the second hydraulic metallic fitting 42 in the same direction simultaneously, so as to avoid twisting and stressing the flexible hose portion 44 during installation. Preferably, when at rest (uninstalled condition) the first hydraulic metallic fitting 40, the flexible hose portion 44 and the second hydraulic metallic fitting 42 are all approximately axially aligned with one another. Therefore, when the brake pipe fitting tool 16 is used during installation, the alignment of the first hydraulic metallic fitting 40, the flexible hose portion 44 and the second hydraulic metallic fitting 42 is maintained.

Consequently, during installation and removal, the hydraulic brake pipe assembly 14 is preferably rotated as a single unit. Hence, the threaded bore 40a and the threaded outer portion 42a rotate together, in unison. More specifically, when the threaded bore 40a is threaded to a male connector of one of the hydraulic lines L, the first hydraulic metallic fitting 40 is rotated together with the second hydraulic metallic fitting 42 as a single unit. Further, when the threaded outer portion 42a is installed to a female connector of another of the hydraulic lines L, the first hydraulic metallic fitting 40 and the second hydraulic metallic fitting 42 are rotated together as a single unit.

As shown in FIGS. 9 through 14, the brake pipe fitting tool 16 is specifically designed and dimensioned to retain the first hydraulic metallic fitting 40 and the second hydraulic metallic fitting 42 such that they rotate together in unison when torque is applied to the hydraulic brake pipe assembly 14. Further, the brake pipe fitting tool 16 is designed to avoid application of torque to the flexible hose portion 44. Specifically, a space is defined between the first hydraulic metallic fitting 40 and the second hydraulic metallic fitting 42 that ensures there is little or no contact between the brake pipe fitting tool 16 and the flexible hose portion 44 of the hydraulic brake pipe assembly 14.

The brake pipe fitting tool 16 is now described in detail with specific reference to FIGS. 9 through 14. The brake pipe fitting tool 16 is made of metal or other rigid material able to withstand the torque associated with tightening hydraulic tubes or lines.

The brake pipe fitting tool 16 basically includes a first hydraulic pipe wrench 50, a second hydraulic pipe wrench 52, a connecting portion 54 and a handle portion 56. The first hydraulic pipe wrench 50, the second hydraulic pipe wrench 52, the connecting portion 54 and the handle portion 56 are formed as a single, rigid, unitary, monolithic element. For example, the first hydraulic pipe wrench 50, the second hydraulic pipe wrench 52, the connecting portion 54 and the handle portion 56 can be made in a single forging process, can be formed in a molding process or can be machined out of a single metallic blank block of material.

Figure 10:
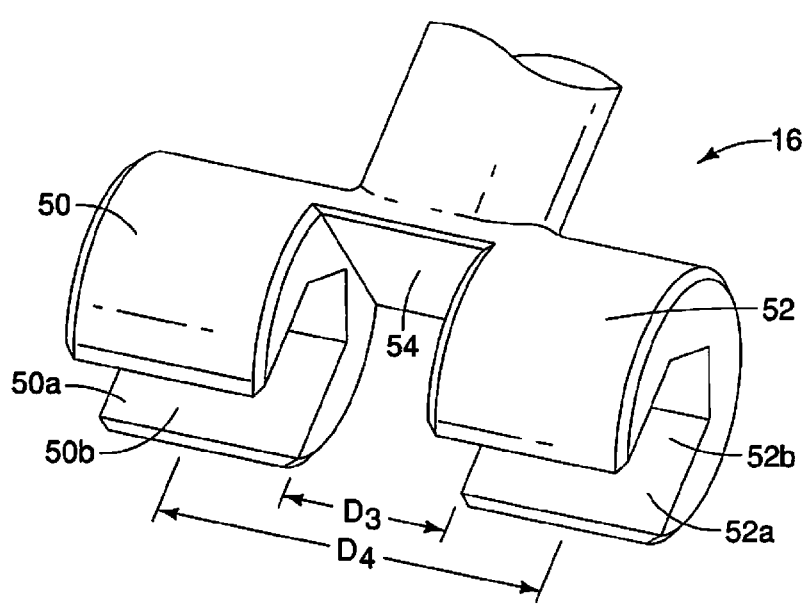
FIG. 10 is a perspective view of one end of the brake pipe fitting tool showing a first hydraulic pipe wrench, a second hydraulic pipe wrench, a connecting portion and a portion of the handle portion in accordance with the first embodiment.

The first hydraulic pipe wrench 50 and the second hydraulic pipe wrench 52 are parallel to one another but are spaced apart from one another by a distance $D_3$, as shown in FIG. 10. The first hydraulic pipe wrench 50 includes a first jaw 50a that defines a first hydraulic pipe insertion opening 50b. The second hydraulic pipe wrench 52 includes a second jaw 52a that defines a second hydraulic pipe insertion opening 52b. The connecting portion 54 rigidly connects the first hydraulic pipe wrench 50 to the second hydraulic pipe wrench 52 and extends therebetween. In the depicted embodiment, the handle portion 56 is fixed to the connecting portion 54 and extends from the connecting portion 54 in a direction away from the first hydraulic pipe wrench 50 and the second hydraulic pipe wrench 52.

The connecting portion 54 connects the first hydraulic pipe wrench 50 to the second hydraulic pipe wrench 52 such that the first hydraulic pipe wrench 50 and the second hydraulic pipe wrench 52 are fixedly and rigidly connected to one another, but spaced apart from one another by the distance $D_3$. Further, the first hydraulic pipe insertion opening 50b and the second hydraulic pipe insertion opening 52b are parallel to one another and aligned with one another. In the depicted embodiment, the handle portion 56 is rigidly fixed to the connecting portion 54. However, the handle portion 56 can alternatively be fixed to the first hydraulic pipe wrench 50 or the second hydraulic pipe wrench 52.

In the depicted embodiment, the handle portion 56 extends from the connecting portion 54 in a direction opposite and away the first hydraulic pipe insertion opening 50b and the second hydraulic pipe insertion opening 52b. Further, the handle portion 56 is fixed to the connecting portion 54 at a point that is located midway between the first hydraulic pipe wrench 50 and the second hydraulic pipe wrench 52.

The first hydraulic pipe insertion opening 50b is dimensioned to receive the first hydraulic metallic fitting 40 and the second hydraulic pipe insertion opening 52b is configured to simultaneously receive the second hydraulic metallic fitting 42 such that the first hydraulic metallic fitting 40 and the second hydraulic metallic fitting 42 of the hydraulic pipe assembly 14 are rotated simultaneously by the brake pipe fitting tool 16.

More specifically, the first hydraulic pipe insertion opening 50b of the first jaw 50a of the first hydraulic pipe wrench 50 is defined by a plurality of a surfaces that at least partially define a hexagonal shape with an axis A centered within the hexagonal shape. Similarly, the second hydraulic pipe insertion opening 52b of the second jaw 52a of the second hydraulic pipe wrench 52 is defined by a plurality of a surfaces that at least partially define a hexagonal shape such that the axis A extends through the second hydraulic pipe insertion opening 52b and is centered within the hexagonal shape of the second hydraulic pipe insertion opening 52b. Specifically, a surface S1 and a surface S2 of the first jaw 50a and are parallel to one another, face one another and are both flat surfaces. The surface S1 extends to a surface S3 and is offset by 120 degrees from the surface S3. The surface S2 extending to a surface S4 that is offset by 120 degrees from the surface S4. The surfaces S3 and S4 intersect and are offset by 120 degrees. Further, the surfaces S1, S2, S3 and S4 define four surfaces of the hexagonal shape. The surfaces S1, S2, S3 and S4 similarly correspond to co-planar surfaces of the second jaw 52a.

Figure 14:
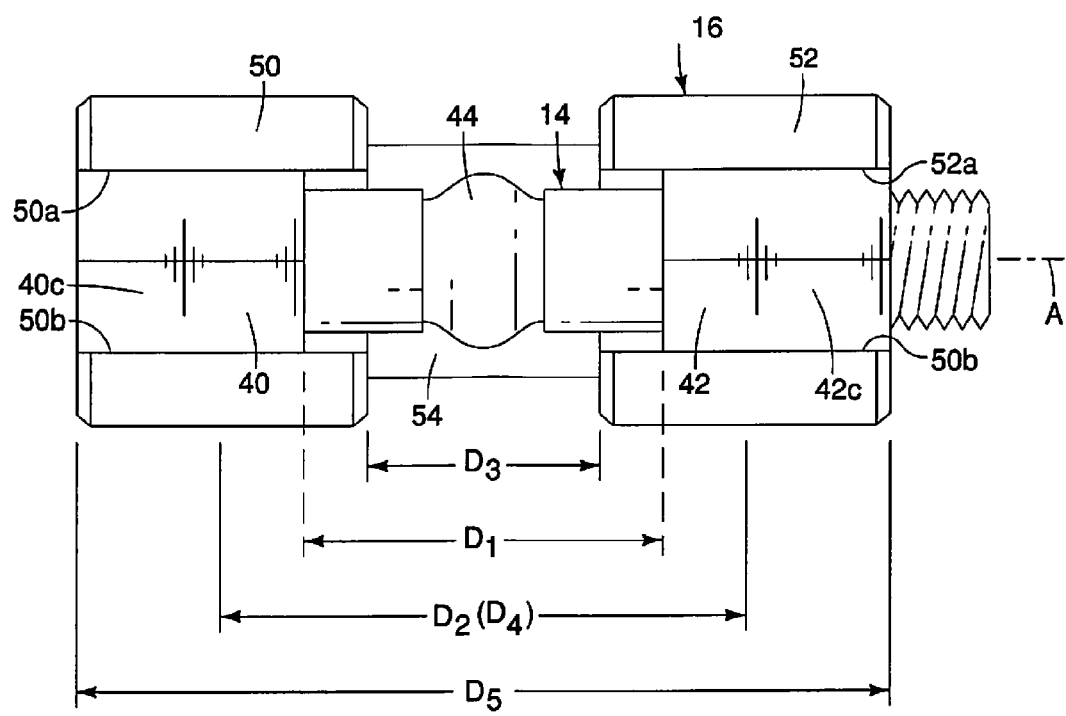
FIG. 14 is another end view of the brake pipe fitting tool showing the first hydraulic pipe wrench and the second hydraulic pipe wrench engaged with respective ends of the hydraulic brake pipe assembly in accordance with the first embodiment.

As shown in FIG. 14, the distance $D_3$ between the first hydraulic pipe wrench 50 and the second hydraulic pipe wrench 52 is depicted as being smaller than the distance $D_1$ between the wrench receiving portion 40c and the wrench receiving portion 42c. However, it should be understood from the description herein and the drawings that the distance $D_3$ can be equal to the distance $D_1$.

Further, as shown in FIG. 14 a distance $D_4$ is defined between respective mid-points of the first hydraulic pipe insertion opening 50b and the second hydraulic pipe insertion opening 52b. The distance $D_4$ is less than the distance $D_2$ of the hydraulic brake pipe assembly 14. However, it should be understood from the drawings and the description herein that the distance $D_4$ can also be approximately equal to the distance $D_2$ of the hydraulic brake pipe assembly 14.

As shown in FIG. 7, the hydraulic brake pipe assembly 14 has an overall length $D_5$, as measured from the first hydraulic metallic fitting 40 to the second hydraulic metallic fitting 42 (ignoring the externally threaded outer portion 42a). As shown in FIG. 14, from end to end the first hydraulic pipe wrench 50 and the second hydraulic pipe wrench 52 have an overall width that is approximately equal to the overall length $D_5$ of the hydraulic brake pipe assembly 14. In order for the brake pipe fitting tool 16 to engage the hydraulic brake pipe assembly 14, the overall width of the brake pipe fitting tool 16 is preferably equal to or less that the distance $D_5$.

With the wrench receiving portion 40c of the first hydraulic metallic fitting 40 inserted into the first hydraulic pipe insertion opening 50b of the first wrench 50 and the wrench receiving portion 42c of the second hydraulic metallic fitting 42 inserted into the second hydraulic pipe insertion opening 62b of the second wrench 52, the first hydraulic metallic fitting 40 and the second hydraulic metallic fitting 42 move together with movement of the brake pipe fitting tool 16 and are therefore prevented from rotating with respect to one another. Further, the flexible hose portion 44 is not contacted by the brake pipe fitting tool 16 and is free to flex in the space defined between the first wrench 50 and the second wrench 52.

Second Embodiment

Figure 15:
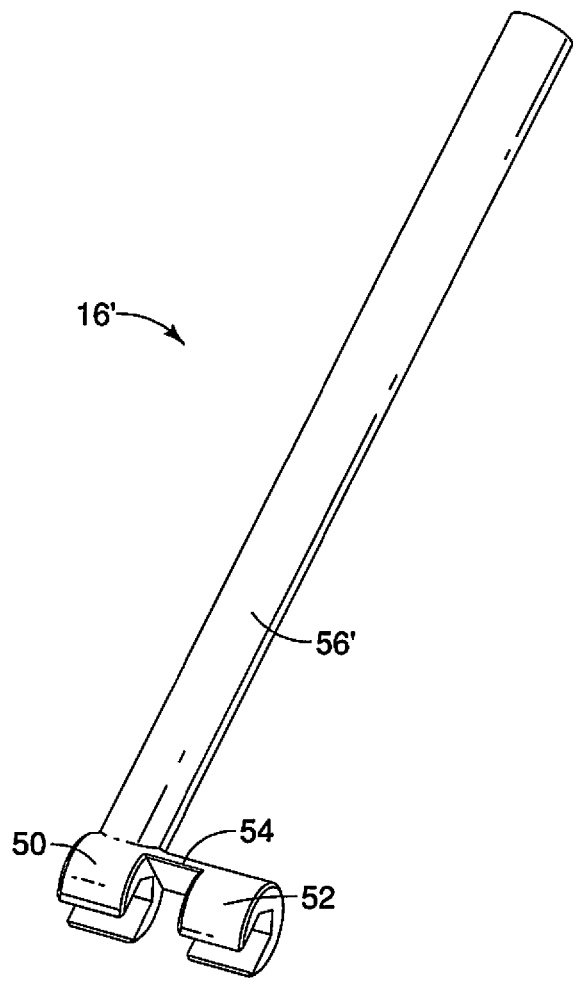
FIG. 15 is a perspective view of a brake pipe fitting tool showing a handle portion in accordance with a second embodiment.

Referring now to FIG. 15, a brake pipe fitting tool 16' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The brake pipe fitting tool 16' includes all of the features of the first embodiment, except that the handle portion 56 of the first embodiment has been modified and replaced with a handle portion 56', as described below. The brake pipe fitting tool 16' includes the first hydraulic pipe wrench 50, the second hydraulic pipe wrench 52 and the connecting portion 54 as described above with respect to the first embodiment. However, in the second embodiment the handle portion 56' extends from the first hydraulic pipe wrench 50. However, it should be understood given the symmetry of the first hydraulic pipe wrench 50 and the second hydraulic pipe wrench 52, that the handle portion 56' can also be said to extend from the second hydraulic pipe wrench 52.

In the first embodiment, the handle portion 56 is basically centered between the first hydraulic pipe wrench 50 and the second hydraulic pipe wrench 52. However, in the second embodiment, the handle portion 56' is off-center, and instead is centered relative to the first hydraulic pipe wrench 50. Thus, if only one of the first hydraulic metallic fitting 40 and the second hydraulic metallic fitting 42 is being tightened, the brake pipe fitting tool 16' can be positioned in a manner that centers the torque on the end of the hydraulic brake pipe assembly 14 currently being tightened.

The vehicle dynamic control unit 22 preferably includes a microcomputer with a control program that carries out the procedures of any one or all of the ABS, TCS and VDC systems. The vehicle dynamic control unit 22 can also include other conventional components such as an input interface circuit, an output interface circuit, and storage devices such as a ROM (Read Only Memory) device and a RAM (Random Access Memory) device. The microcomputer of the vehicle dynamic control unit 22 is programmed to control the hydraulic pressure in the brake lines L in accordance with the procedures of any one or all of the ABS, TCS and VDC systems. The memory circuit stores processing results and control programs such as ones for any one or all of the ABS, TCS and VDC systems operation that are run by the processor circuit. The internal RAM of the vehicle dynamic control unit 22 stores statuses of operational flags and various control data. The internal ROM of the vehicle dynamic control unit 22 stores data, code and instructions for various operations. It will be apparent to those skilled in the art from this disclosure that the precise structure and algorithms for the vehicle dynamic control unit 22 can be any combination of hardware and software that will carry out the functions of the present invention.

The various elements of the vehicle 10 and the braking system 12 (other than the hydraulic brake pipe assemblies 14) are conventional components that are well known in the art. Since these elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the braking system 12. Accordingly, these terms, as utilized to describe the present invention should be interpreted relative to a vehicle equipped with the braking system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A hydraulic brake pipe assembly and brake pipe fitting tool, wherein:

the hydraulic brake pipe assembly comprises:
a first hydraulic metallic fitting having a first wrench receiving portion, a second hydraulic metallic fitting having a second wrench receiving portion, and a flexible hose portion extending from the first hydraulic metallic fitting to the second hydraulic metallic fitting and being attached to each of the first hydraulic metallic fitting and the second hydraulic metallic fitting; and
the brake pipe fitting tool comprises:
a first hydraulic pipe wrench having a first jaw defining a first hydraulic pipe insertion opening dimensioned to receive the first hydraulic metallic fitting preventing rotation of the first hydraulic metallic fitting relative to the first jaw;
a second hydraulic pipe wrench having a second jaw defining a second hydraulic pipe insertion opening dimensioned to receive the second hydraulic metallic fitting preventing rotation of the second hydraulic metallic fitting relative to the second jaw;
a connecting portion connecting the first hydraulic pipe wrench to the second hydraulic pipe wrench such that the first hydraulic pipe wrench and the second hydraulic pipe wrench are fixedly and rigidly connected to one another, spaced apart from one another by a predetermined distance, with the first hydraulic pipe insertion opening and the second hydraulic pipe insertion opening being parallel to one another and aligned with one another; and
a handle portion rigidly fixed to one of the first hydraulic pipe wrench, the second hydraulic pipe wrench or the connecting portion, with the first hydraulic pipe wrench, the second hydraulic pipe wrench, the connecting portion and the handle portion being formed as a single, rigid, unitary, monolithic element, and
the predetermined distance between the first hydraulic pipe wrench and the second hydraulic pipe wrench is approximately equal to a distance defined between the first wrench receiving portion of the first hydraulic metallic fitting and the second wrench receiving portion of the second hydraulic metallic fitting of the hydraulic pipe assembly.

2. The hydraulic brake pipe assembly and brake pipe fitting tool according to claim 1, wherein
the first hydraulic pipe insertion opening of the first jaw of the first hydraulic pipe wrench is defined by a plurality of first surfaces that at least partially define a first hexagonal shape with an axis centered within the first hexagonal shape, and
the second hydraulic pipe insertion opening of the second jaw of the second hydraulic pipe wrench is defined by a plurality of second surfaces that at least partially define a second hexagonal shape such that the axis extends through the second hydraulic pipe insertion opening and is centered within the hexagonal shape of the second hydraulic pipe insertion opening.

3. The hydraulic brake pipe assembly and brake pipe fitting tool according to claim 2, wherein
the first wrench receiving portion of the first hydraulic metallic fitting has a first hexagonal shaped outer surface corresponding to the first hexagonal shape of the first hydraulic pipe insertion opening, and
the second wrench receiving portion of the second hydraulic metallic fitting has a second hexagonal shaped outer surface corresponding to the second hexagonal shape of the second hydraulic pipe insertion opening.

4. The hydraulic brake pipe assembly and brake pipe fitting tool according to claim 1, wherein
with the first wrench receiving portion of the first hydraulic metallic fitting inserted into the first hydraulic pipe insertion opening of the first wrench and the second wrench receiving portion of the second hydraulic metallic fitting inserted into the second hydraulic pipe insertion opening of the second wrench, the first hydraulic metallic fitting and the second hydraulic metallic fitting move together with movement of the brake pipe fitting tool and are prevented from rotating with respect to one another.

5. The hydraulic brake pipe assembly and brake pipe fitting tool according to claim 4, wherein
with the wrench receiving portion of the first hydraulic metallic fitting inserted into the first hydraulic pipe insertion opening of the first wrench and the wrench receiving portion of the second hydraulic metallic fitting inserted into the second hydraulic pipe insertion opening of the second wrench, the flexible hose portion is free to flex in a space defined between the first wrench and the second wrench.

6. A hydraulic brake pipe assembly and brake pipe fitting tool, wherein:
the hydraulic brake pipe assembly comprises:
a first hydraulic metallic fitting having a first wrench receiving portion, a second hydraulic metallic fitting having a second wrench receiving portion, and a flexible hose portion extending from the first hydraulic metallic fitting to the second hydraulic metallic fitting and being attached to each of the first hydraulic metallic fitting and the second hydraulic metallic fitting; and
the brake pipe fitting tool comprises:
a first hydraulic pipe wrench having a first jaw having surfaces defining a first hydraulic pipe insertion opening dimensioned to receive the first hydraulic metallic fitting;
a second hydraulic pipe wrench having a second jaw having surfaces defining a second hydraulic pipe insertion opening dimensioned to receive the second hydraulic metallic fitting;
a connecting portion rigidly and non-movably connected to the first hydraulic pipe wrench and rigidly and non-movably connected to the second hydraulic pipe wrench such that the first hydraulic pipe wrench and the second hydraulic pipe wrench are non-movable relative to one another, and the first hydraulic pipe wrench and the second hydraulic pipe wrench are spaced apart from one another by a predetermined distance, with the first hydraulic pipe insertion opening and the second hydraulic pipe insertion opening being parallel to one another and aligned with one another; and
a handle portion rigidly fixed to one of the first hydraulic pipe wrench, the second hydraulic pipe wrench and the connecting portion, with the first hydraulic pipe wrench, the second hydraulic pipe wrench, the connecting portion and the handle portion being formed as a single, rigid, unitary, monolithic element, and
the brake pipe fitting tool being configured such that with the surfaces of the first jaw of the first hydraulic pipe wrench contacting and engaging the first wrench receiving portion of the first hydraulic metallic fitting and the surfaces of the second jaw of the second hydraulic pipe wrench contacting and engaging the second wrench receiving portion of the second hydraulic metallic fitting, the first hydraulic metallic fitting and the second hydraulic metallic fitting are prevented from rotating relative to one another.

7. The hydraulic brake pipe assembly and brake pipe fitting tool according to claim 6, wherein
the predetermined distance between the first hydraulic pipe wrench and the second hydraulic pipe wrench is approximately equal to a distance defined between the first wrench receiving portion of the first hydraulic metallic fitting and the second wrench receiving portion of the second hydraulic metallic fitting of the hydraulic pipe assembly.

8. A hydraulic brake pipe assembly and brake pipe fitting tool, wherein:
the brake pipe fitting tool comprises:
a first hydraulic pipe wrench having a first jaw defining a first hydraulic pipe insertion opening dimensioned to receive the first hydraulic metallic fitting, the first hydraulic pipe insertion opening having a first surface and a second surface that are parallel to one another, face one another and are both flat surfaces, each of the first surface and the second surface extending from respective distal edges of the first jaw, the first surface extending to a third surface that is offset by 120 degrees from the first surface, the second surface extending to a fourth surface that is offset by 120 degrees from the second surface, and the third surface intersecting with and being offset by 120 degrees from the fourth surface such that the first, second, third and fourth surfaces define four surfaces of a hexagonal shape;
a second hydraulic pipe wrench having a second jaw defining a second hydraulic pipe insertion opening dimensioned to receive the second hydraulic metallic fitting the second hydraulic pipe insertion opening having a fifth surface and a sixth surface that are parallel to one another, face one another and are both flat surfaces, each of the fifth surface and the sixth surface extending from respective distal edges of the second jaw, the fifth surface extending to a seventh surface that is offset by 120 degrees from the fifth surface, the sixth surface extending to an eighth surface that is offset by 120 degrees from the sixth surface, and the seventh surface intersecting with and being offset by 120 degrees from the eighth surface such that the fifth, sixth, seventh and eighth surfaces define four surfaces of a hexagonal shape, with the first surface being aligned and co-planar with the fifth surface, the second surface being aligned and co-planar with the sixth surface, the third surface being aligned an co-planar with the seventh surface and the fourth surface being aligned and coplanar with the eight surface;
a connecting portion connecting the first hydraulic pipe wrench to the second hydraulic pipe wrench such that the first hydraulic pipe wrench and the second hydraulic pipe wrench are fixedly and rigidly connected to one another and are spaced apart from one another by a predetermined distance, with the first hydraulic pipe insertion opening and the second hydraulic pipe insertion opening being parallel to one another and aligned with one another; and
a handle portion rigidly fixed to one of the first hydraulic pipe wrench, the second hydraulic pipe wrench or the connecting portion, with the first hydraulic pipe wrench, the second hydraulic pipe wrench, the connecting portion and the handle portion being formed as a single, rigid, unitary, monolithic element.

9. The hydraulic brake pipe assembly and brake pipe fitting tool according to claim 8, wherein
the hydraulic brake pipe assembly comprises:
a first hydraulic metallic fitting having a first wrench receiving portion, a second hydraulic metallic fitting having a second wrench receiving portion, and a flexible hose portion extending from the first hydraulic metallic fitting to the second hydraulic metallic fitting and being attached to each of the first hydraulic metallic fitting and the second hydraulic metallic fitting, such that
with the first, second, third and fourth surfaces of the first hydraulic pipe wrench contacting and engaging the first wrench receiving portion and the fifth, sixth, seventh and eighth surfaces of the second hydraulic pipe wrench contacting and engaging the second wrench receiving portion, the first hydraulic metallic fitting and the second hydraulic metallic fitting are prevented from rotating relative to one another.

10. The hydraulic brake pipe assembly and brake pipe fitting tool according to claim 9, wherein
the predetermined distance between the first hydraulic pipe wrench and the second hydraulic pipe wrench is approximately equal to a distance defined between the first wrench receiving portion of the first hydraulic metallic fitting and the second wrench receiving portion of the second hydraulic metallic fitting of the hydraulic pipe assembly.

* * * * *